United States Patent [19]

Sakai et al.

[11] Patent Number: 5,754,361
[45] Date of Patent: May 19, 1998

[54] INFORMATION RECORDING AND/OR REPRODUCING APPARATUS HAVING A TAPE THREADING DEVICE WITH TAPE GUIDE MEMBERS HAVING MINIMUM TAPE WRAPPING ANGLES

[75] Inventors: Kazuo Sakai; Tomokazu Ishii, both of Chiyoda-machi; Tadashi Honzawa; Masaru Orii, both of Odawara; Fujio Tajima; Kooetsu Okuyama, both of Tsuchiura; Takao Terayama, Ushiku, all of Japan

[73] Assignee: Hitachi, Ltd., Tokyo, Japan

[21] Appl. No.: 531,107

[22] Filed: Sep. 20, 1995

[30] Foreign Application Priority Data

Sep. 20, 1994 [JP] Japan ................ 6-224761

[51] Int. Cl.[6] .................................. G11B 15/66
[52] U.S. Cl. .................................................. 369/95
[58] Field of Search ................... 360/95, 85; 242/333.2, 242/333.4, 332.8, 332.1, 326.4, 346; 226/91–92

[56] References Cited

U.S. PATENT DOCUMENTS

| | | | |
|---|---|---|---|
| 4,196,873 | 4/1980 | Kudoh | 242/332.4 |
| 4,399,936 | 8/1983 | Rueger | 226/92 |
| 4,949,914 | 8/1990 | Barton, Jr. | 360/95 |
| 5,155,639 | 10/1992 | Platter et al. | 360/95 |
| 5,202,809 | 4/1993 | Dodt et al. | 360/95 |
| 5,219,129 | 6/1993 | Spicer et al. | 360/95 |
| 5,333,810 | 8/1994 | Hoge et al. | 242/332.4 |
| 5,374,003 | 12/1994 | Hoge et al. | 242/332.7 |
| 5,478,021 | 12/1995 | Davis et al. | 242/332.1 |
| 5,542,620 | 8/1996 | Ohshita | 242/332.4 |

FOREIGN PATENT DOCUMENTS 62-88768  4/1987  Japan.

OTHER PUBLICATIONS

Japanese Abstract of 62-88768, Apr. 23, 1987, mentioned in "AK" above.

*Primary Examiner*—Robert S. Tupper
*Assistant Examiner*—Brian E. Miller
*Attorney, Agent, or Firm*—Evenson McKeown Edwards & Lenahan, PLLC

[57] ABSTRACT

A tape cartridge is received into one end of an information recording and/or reproducing apparatus conforming to an 8 inch Form Factor Size. A first reel is held inside this tape cartridge, and a tape wound onto this first reel is extracted from a cartridge including the first reel and threaded by a simple pivotal motion of a tape threading arm, and wound onto a second reel disposed at the other end of the information recording and/or reproducing apparatus. The pivotal center of the tape threading arm and a recording head are disposed at opposite sides respectively with regard to a line joining a first and second reel axes to facilitate a compact overall construction. Tape guides formed into cylindrical rollers and the recording head are disposed on the inner side of the trajectory of the tape threading to transfer the tape smoothly. The tape guides and the recording head may be arranged substantially in line. Also, the tape guides next to the recording head may be fixed rollers.

17 Claims, 7 Drawing Sheets

FIG. 13
FIG. 14
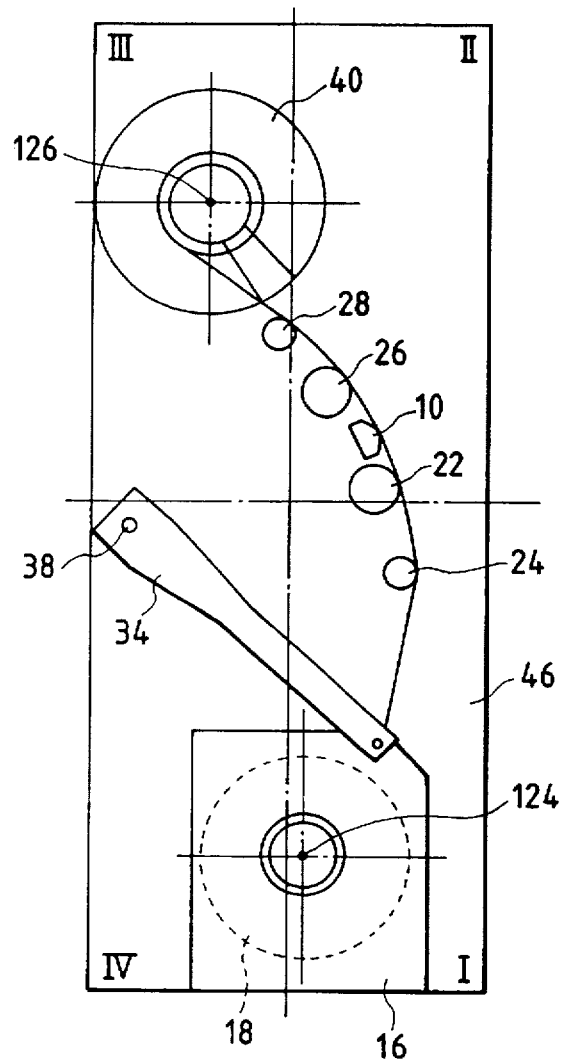
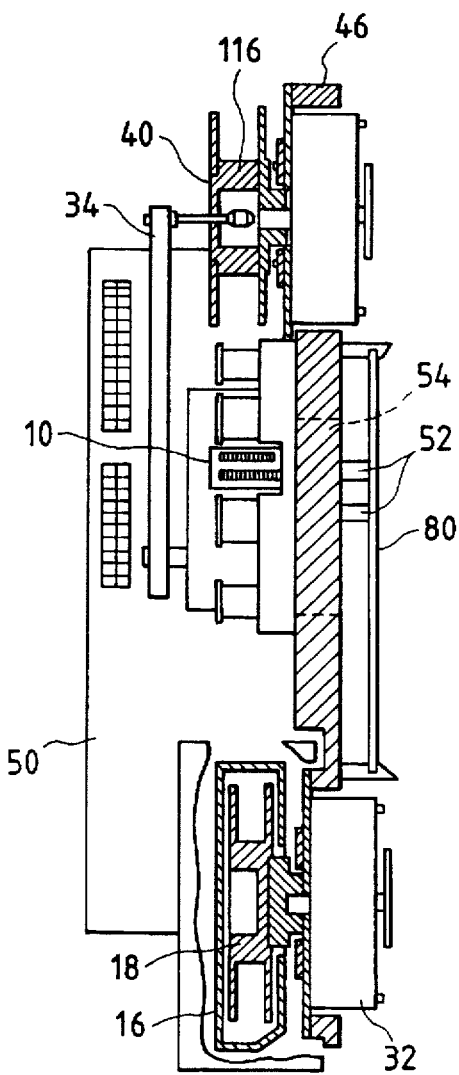

s,754,361

INFORMATION RECORDING AND/OR REPRODUCING APPARATUS HAVING A TAPE THREADING DEVICE WITH TAPE GUIDE MEMBERS HAVING MINIMUM TAPE WRAPPING ANGLES

BACKGROUND AND SUMMARY OF THE INVENTION

This invention relates to an information recording and/or reproducing apparatus for recording and/or reproducing to or from a recording tape, more particularly, to an apparatus which has a tape transport system for threading and transferring the tape.

In a conventional information recording and/or reproducing apparatus, as disclosed in U.S. Pat. No. 4,399,936 ('936 patent), an information recording head and tape guides are disposed intermediate a first and a second reel for transferring a recording tape from the first reel to the second reel. In this arrangement, the tape must be transferred in a tape threading path formed around the outer periphery of the second reel when the tape is extracted from the first reel and rewound to the first reel. In addition, a tape threading device, which extracts the tape from the first reel and loads the tape onto the second reel, has a cam member having a cam groove corresponding to a tape threading path and an arm mechanism including a plurality of foldable link members.

In this '936 patent, because the information head is disposed on the outer side of the second reel, the tape must be threaded along a path formed outside of the second reel. Hence, wrapping angles at tape guides become large and friction losses at the tape guides are increased with increase of the wrapping angle. This arrangement causes a problem with stability of the tape transferring process. To overcome this problem, it is proposed in this patent that the tape guides have blow holes for levitating the tape by air to reduce the friction loss. However, in this situation, a significant air supply is required, with consequent noise generation.

Because the tape is threaded outside of the second reel in this '936 patent, the tape threading mechanism must also be disposed outside of the second reel, making it difficult to reduce the size of the tape threading mechanism. Since a path of the tape from the first reel to the second reel is complicated, the tape threading mechanism is required to have a complicated mechanism.

A sensor for sensing tension of the tape is disposed in a tape transferring path in the '936 patent, this further complicating measures to reduce the size of the apparatus. This sensor detects a pressure of air between the tape and the sensor itself.

These requirements in the apparatus of the '936 patent to accomodate the tape threading and guiding device complicate the device and increase its size.

Now, what is called "Form Factor Size" is being adopted by many manufacturers for standardizing a geometry of a mass storage apparatus. In a mass storage apparatus, which utilize a magnetic tape having the same size as the model 3480 tape cartridge of IBM Corporation, so called "8 inch Form Factor Size" is provided. This standard 8 inch Form Factor Size has a geometry of a width of 8.5 inches, a height of 5 inches, and a depth of 15 inches. This geometry is relatively small compared with a conventional storage apparatus using a magnetic tape, therefore, some new read/write devices using a magnetic tape are proposed.

One of such devices is disclosed in U.S. Pat. No. 5,155, 639 ('639 patent). In this '639 patent, a single arm pivots for threading a magnetic tape from a tape cartridge position to a take-up reel position to reduce a size of the apparatus or device. However, this '639 patent arrangement has a relatively complicating guide assembly using air to reduce friction between the tape and the guide assembly, hence the apparatus becomes complicated even though the size is reduced. As a result, reliability of the apparatus is not much improved and the apparatus is expensive to make.

There is therefore needed an information recording and/or reproducing apparatus having a small size and an improved reliability, while still reducing the friction loss at tape guides, simplifying a tape threading mechanism, and reducing the tape threading system in size.

These needs are met by preferred embodiments of the invention which provide for an optimum utilization of the available space and simplification of the apparatus required in a recording apparatus of the above-described type to accommodate a removable tape cartridge containing a first tape reel with tape to be recorded and/or read, a relatively fixedly located second tape reel, a recording/reading head, and a tape threading arrangement for threading tape from the first tape reel to the second tape reel with the tape appropriately disposed to travel past the recording/reading head.

Each of the preferred embodiments of the invention include: a first tape reel driver for supporting and rotating a first tape reel about a first reel axis, a second tape reel driver for supporting and rotating a second tape reel about a second reel axis, a recording/reproducing head for reading and recording information from and to a tape as it is wound between the first and second tape reels (hereafter referred to also as a "recording head" or "head"), and a tape threading mechanism for threading tape from the first tape reel to the second tape reel.

According to a first advantageous feature of certain preferred embodiments of the invention, the tape threading mechanism incudes a pivotal threading arm which pivots about a threading arm pivot axis, the threading arm having a tape holding portion spaced from the threading arm pivot axis which engages a tape end at the first tape reel and transfers the tape end in a substantially circular arc to the second reel to be wound onto the second reel with the tape extending adjacent the recording head by pivotal movement about the threading arm pivot axis, wherein the threading arm pivot axis and the recording head are disposed at opposite sides of a line joining the first and second reel axes. This particular disposition of the threading arm, recording head and tape reels advantageously provides for simple tape threading operation and apparatus with optimum use of the space available.

According to a second advantageous feature of preferred embodiments of the invention, the tape threading mechanism includes a pivotal threading arm which pivots about a threading arm pivot axis, the threading arm having a tape holding portion spaced from the threading arm pivot axis which engages a tape end at the first tape reel and transfers the tape end to the second reel to be wound onto the second reel with the tape extending adjacent the recording head by pivotal movement about the threading arm pivot axis, wherein at least two tape guide members are disposed spaced from one another in the tape travel path at one side of the recording head, at least one of said tape guide members having a cylindrical shape.

According to a third advantageous feature of preferred embodiments of the invention, the tape threading mechanism includes a pivotal threading arm which pivots about a threading arm pivot axis, the threading arm having a tape holding portion spaced from the threading arm pivot axis which engages a tape end at the first tape reel and transfers the tape end to the second reel to be wound onto the second reel with the tape extending adjacent the head by pivotal movement about the threading arm pivot axis, wherein a tape guide assembly is provided for defining the tape travel path adjacent the recording head, the tape guide assembly including first, second, third and fourth tape guide members spaced from one another and disposed in series along the tape travel path from the first reel to the second reel, said first and second tape guide members being disposed at one side of the head and said third and fourth tape guide members being disposed at the other side of the head, and wherein at least one of the tape guide members on each side of the head is rotatable in response to tape movements. This arrangement provides for a simple, smooth and reliable tape guidance.

According to a fourth advantageous feature of the invention, the tape guide members referred to in the immediately preceding paragraph are disposed so that the cumulative tape wrapping angles of all tape guide members is less than 90°. In especially preferred embodiments, the tape wrapping angle at any given tape guide member is less than 10°. By minimizing the tape wrapping angles at the tape guides, the friction forces in the tape during operation are reduced. In especially preferred embodiments, the tape guide wrapping angle for the tape guides farthest from the head are greater than for those located closest to the head.

According to a fifth advantageous feature of the invention, the apparatus includes a generally rectangularly shaped box like housing which has a tape cartridge opening at one end for accommodating insertion of a tape cartridge with a first tape reel in a longitudinal cartridge insertion direction of the housing, and a support base in the housing, wherein the first and second tape reel drivers are supported on said base in said housing, wherein said first tape reel is disposed in a portable cartridge which is selectively insertable into and retractable from the tape cartridge opening of the housing, and wherein the first reel axis is laterally offset with respect to the second reel axis in a direction transverse to the longitudinal cartridge insertion direction.

This disposition of the first and second reel axes facilitates an advantageous utilization of the remaining portion of the housing to accommodate the head and the threading mechanism. In especially preferred embodiments, this lateral offset of the first and second reel axes is between 0.3 and 0.5 times the width of the tape cartridge.

According to a sixth advantageous feature of the present invention, the apparatus includes a generally rectangularly shaped box like housing which has a tape cartridge opening at one end for accommodating insertion of a tape cartridge with a first tape reel in a longitudinal cartridge insertion direction of the housing, and a support base in the housing, wherein the first and second tape reel drivers are supported on said base in said housing, wherein said first tape reel is disposed in a portable cartridge which is selectively insertable into and retractable from the tape cartridge opening of the housing, and wherein the distance between the tape extraction aperture and the threading arm pivot axis is substantially equal to the distance between the second reel axis and the threading arm pivot axis.

This arrangement accommodates a simple circular arc threading motion for the threading arm. In especially preferred embodiments, the distance between the head and both the second reel axis and the tape extraction aperture are also equal. This results in a uniform tape transport to and from the head.

According to a seventh advantageous feature of the invention, the apparatus includes a generally rectangularly shaped box like housing which has a tape cartridge opening at one end for accommodating insertion of a tape cartridge with a first tape reel in a longitudinal cartridge insertion direction of the housing, and a support base in the housing, wherein the first and second tape reel drivers are supported on said base in said housing, wherein said first tape reel is disposed in a portable cartridge which is selectively insertable into and retractable from the tape cartridge opening of the housing, and wherein the housing has a housing area in a plane perpendicular to said reel axes defined by a housing length and a housing width, said housing length being between 2 and 2.5 times the housing width.

In especially preferred embodiments, a tape cartridge is provided for the first tape reel, said housing having a width about 1.7 times the width of the tape cartridge.

According to an eighth advantageous feature of the present invention, the apparatus includes a base member which mounts the first and second tape drivers and the head, and the tape threading mechanism has a pivotal threading arm which pivots about a threading arm pivot axis, wherein a first reel axis of the first reel driver, a second reel axis of the second reel driver, the head and the pivot axis are disposed each in different ones of four equal quadrants of the base member respectively.

In preferred embodiments, the housing has a guiding aperture between the threading arm pivot axis and the head for guiding a lead wire bundle connected to the head from top to bottom of the housing.

Preferred embodiments are contemplated which include a first sensor provided at the first reel driver, a second sensor provided at the second reel driver, and a controller for controlling at least one of speed and tension of the tape using outputs of the first and second sensors.

A third sensor is also provided at the tape threading device and the controller controls at least one of a winding and rewinding speed of the tape using the output of the third sensor according to certain preferred embodiments.

A pivotal angle of the threading arm is preferably 120 degrees and a distance between the first and second reel axes is 2 to 2.5 times a length of the tape cartridge with respect to the insertion direction.

It is also preferable that a pivotal center of the arm is disposed between the first and second reel drivers.

It is an advantage of the present invention that main components of an information recording and/or reproducing apparatus are comprised utilizing a combination with one or more of the adavantageous features described above. In especially preferred embodiments, a first reel driver and a second reel driver are disposed at opposite ends of the apparatus, and the recording head and tape guides are disposed between the first reel driver and the second reel driver. The recording head and tape guides are arranged inside of a circular arc starting from a tape extaraction aperture of the tape cartridge and ending at a rotational center of the second reel driver. A distance between the first reel axis and the second reel axis with regard to a perpendicular direction to a tape cartridge insertion direction is preferably less than or equal to half the width of the tape cartridge, and a trajectory of a tape threading arm provided in the tape threading mechanism is a circular arc. Hence, a size of the apparatus is reduced and a wrapping angle of the tape at the tape guides is decreased (e.g., less than 90 degrees).

It is further advantageous according to the present invention to arrange a recording head and tape guides between a tape cartridge and a second reel in a substantially straight line so that the whole apparatus can be made optimally small.

It is still further advantageous according to the present invention that since the wrapping angle of the tape at tape guide is small, the tape guides can be made small. Even if an assembly accuracy of tape guides which should be mounted perpendicularly with respect to the tape transferring direction is poor, a wrapping width of the tape is small because of a small wrapping angle at the tape guide. Then, the tape is not deviated too much in the tape width direction by the tape guides. Therefore, the tape can be more stably transferred.

It is not required to thread the tape around the outer periphery of the second reel according to preferred embodiments of the invention and thus the reels can be disposed on the ends of the apparatus. Then, the apparatus can be made more compact. Because the tape guides and the recording head can be disposed on a substantially straight line between the cartridge and the second reel, the tape can be threaded by a pivoting motion of the tape threading arm, thus a tape threading mechanism can be simplified, and the reliability of the device can be improved.

Because the tape threading trajectory is a smooth circular arc and the extracting angle of the tape threading device at the cartridge is small at about 120°, it is easy to increase a speed of threading and consumed time for threading or un-threading the tape can be reduced.

Since a flexible lead wire bundle connected to the recording head is drawn through a hole provided in the housing and during the tape threading motion there is no interference between the tape threading mechanism and the head or the tape guides, the size of the apparatus can be reduced.

It is also advantageous according to this invention that the structure is rather simple, so that the information recording and/or reproducing apparatus can be easily and economically manufactured.

The above outlined advantageous features of the present invention can be combined according to especially advantageous preferred embodiments of the invention to provide an econmical to produce and reliable tape recording/reproducing apparatus of the general type referred to, especially insofar as the tape threading mechanism and the tape guiding is concerned.

Other objects, advantages and novel features of the present invention will become apparent from the following detailed description of the invention when considered in conjunction with the accompanying drawings.

BRIEF DESCRIPTION OF THE DRAWINGS

FIG. 13 is a schematic plan view of another embodiment of the present invention showing a casing having four equal quadrants; and FIG. 14 is a schematic cross sectional view of preferred embodiments of the present invention showing a circuit board.

DESCRIPTION OF THE PREFERRED EMBODIMENTS

Figure 1:
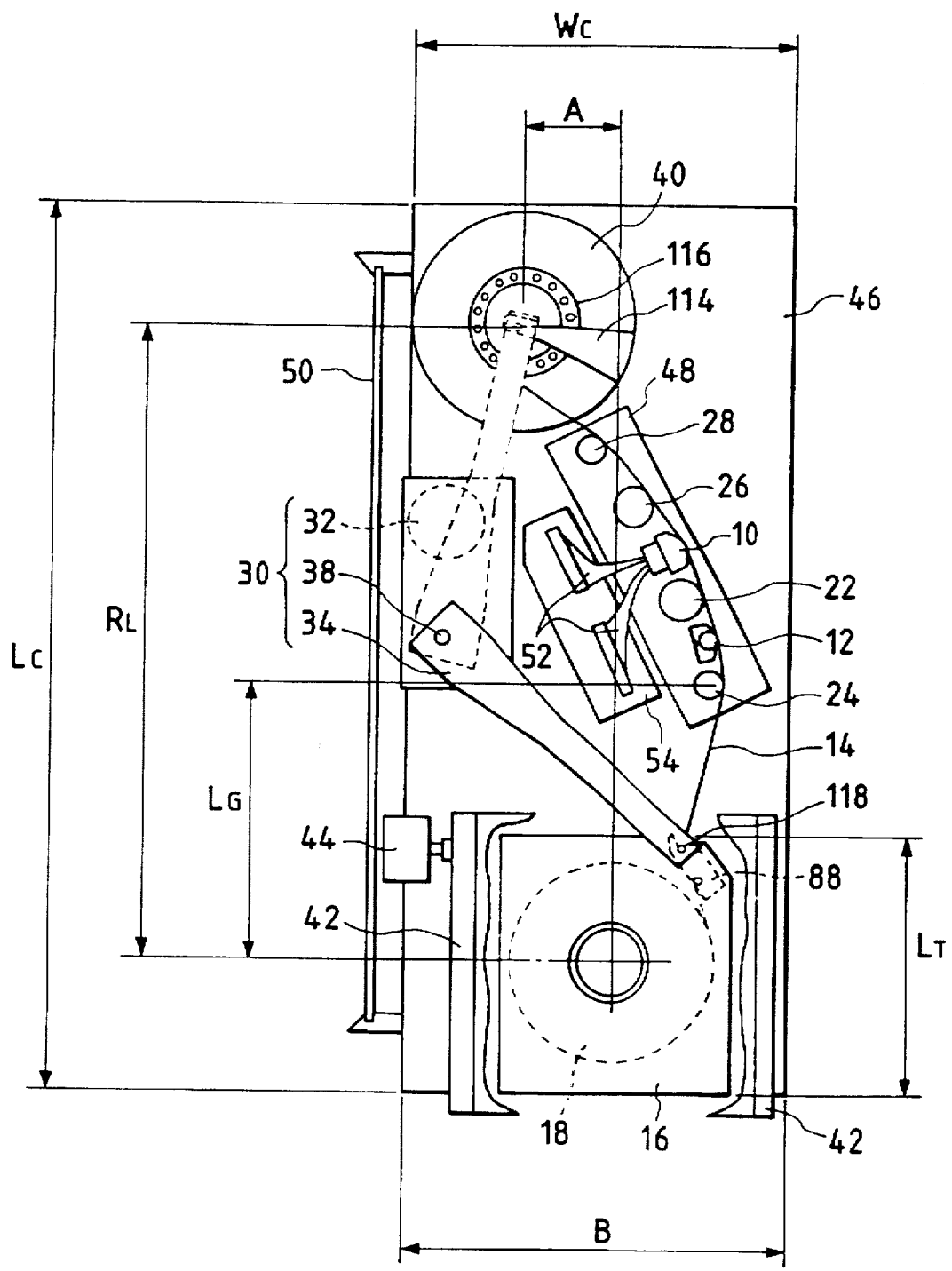
FIG. 1 is a schematic plan view showing an information recording/reproducing apparatus constructed according to a preferred embodiment of the present invention.
Figure 2:
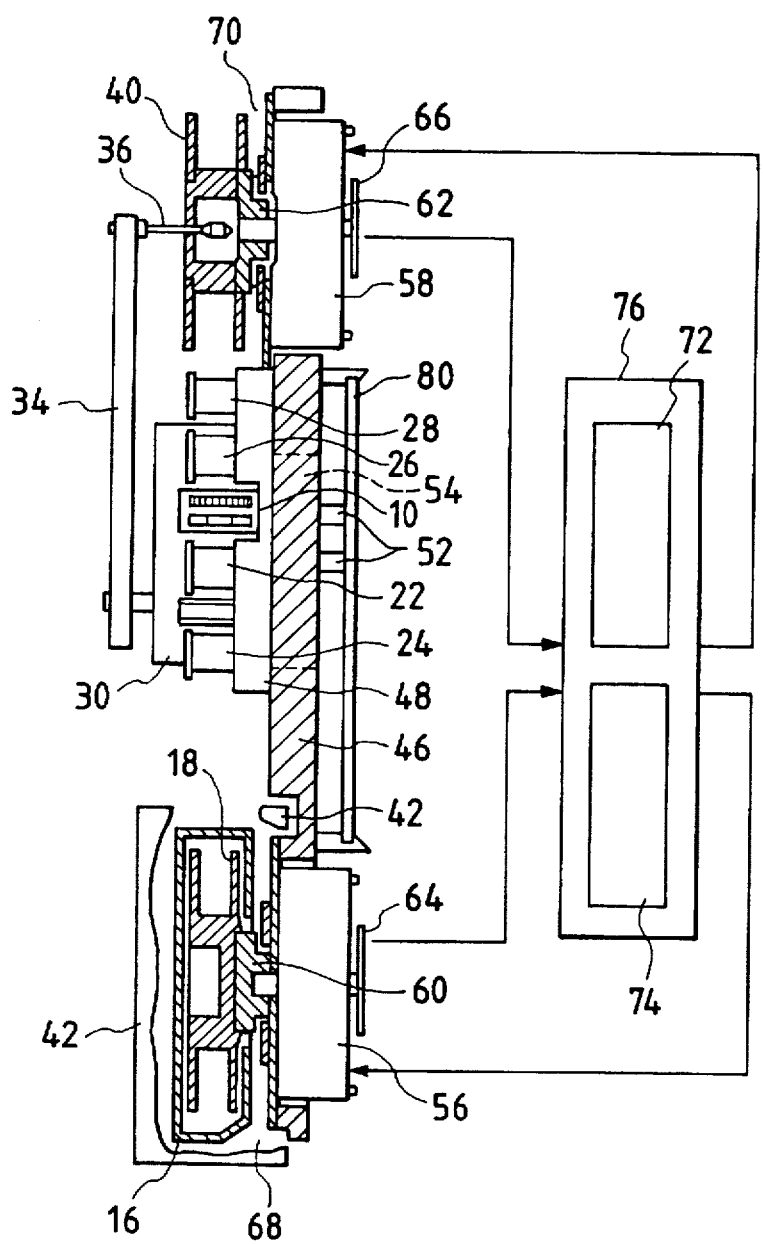
FIG. 2 is a partially cross-sectional side elevation of the embodiment shown in FIG. 1, along with a control system for reel drivers.

A first embodiment of the present invention will now be described with reference to FIGS. 1–9 of the accompanying drawings. FIG. 1 is a schematic plan view of an information recording and/or reproducing apparatus of a preferred embodiment of the present invention, and FIG. 2 is a partially cross-sectioned side elevation view of the embodiment shown in FIG. 1, wherein a control system of reel drivers is also shown.

Figure 3:
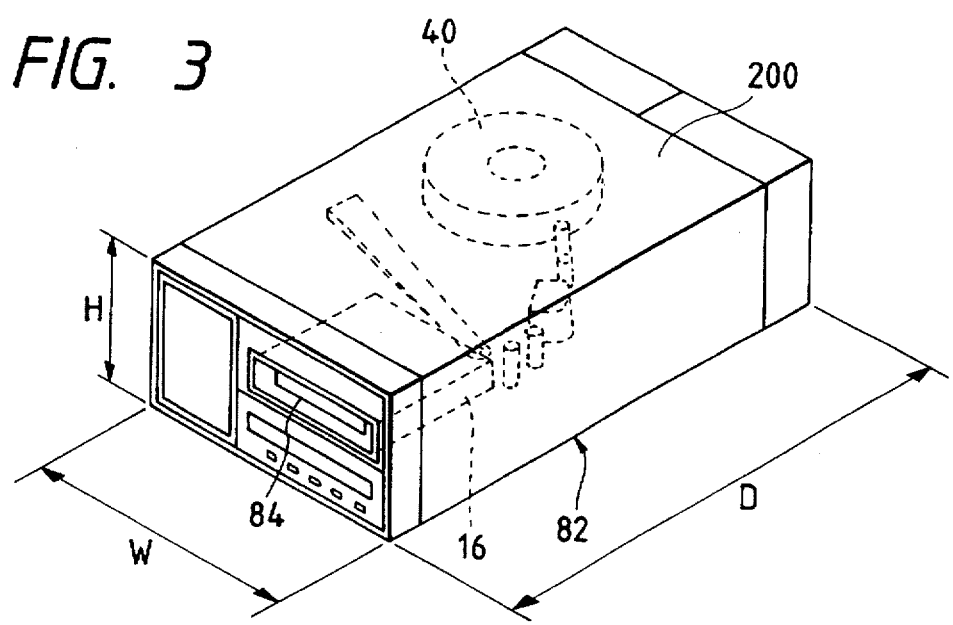
FIG. 3 is a perspective view of the embodiment shown in FIG. 1, shown encased in a housing.

Tape guides 22, 24, 26, 28 are disposed at both sides of an information recording head 10 for recording and/or reproducing information to or from a recording tape 14, with two tape guides arranged at each side of the head. A cleaning device 12, which retrieves dust attached to a back of the tape 14, is disposed between the tape guides 22 and 24. The tape guides 22–28, the recording head 10 and the cleaning device 12 are mounted on a head base member 48. The head base member 48 is fixed or adjustably held to a chassis 46 disposed in a housing 200 (FIG. 3). The cleaning device 12 may also be located between the tape guides 26 and 28 according to other contemplated embodiments. A first reel driver 68 for driving a first reel 18 which winds the recording tape 14 thereunto, and a second reel driver 70 for driving a second reel 40 are disposed adjacent these tape guides 24, 28 on the chassis 46.

The first reel 18 is located in a tape cartridge 16. The tape cartridge 16 is inserted from an inserting opening 84 (shown in FIG. 3), and is settled at one end of the chassis 46 and in the vicinity of the inserting opening 84. The second reel 40 is held on the second reel driver 70 located at the opposite end of the chassis 46 with respect to the tape cartridge 16. When the first reel 18 is inserted from the inserting opening 84, the first reel 18 is coupled with a first reel motor 56 of the first reel driver 70 via a hub 60 by a loading device 42 for a tape cartridge 16. A load motor 44 which is disposed at one end of the loading device 42 for a tape cartridge 16 loads or unloads the tape cartridge 16.

A tape threading device 30 for threading the tape 14 from the tape cartridge 16 to the second reel 40 is disposed between the rotational centers of the first reel driver 68 and second reel driver 70. This tape threading device 30 is comprised of a threading arm 34 and a driving motor 32 which drives the threading arm 34. A pivotal center 38 of the arm 34 is disposed at a center of a circle, a part of which is a circular arc that joins an aperture of the tape cartridge 16 and the rotational center of the second reel 40.

A feature of a main structural part of this embodiment is that the tape extraction aperture 118 of the tape cartridge 16, the rotational center of the second reel driver 70, the recording head 10, and the pivotal center of the arm 34 form a rhombus like shape. The tape extraction aperture 118 of the tape cartridge 16 and the rotational center of the second reel 40 are the apices of the rhombus at the major axis, and the recording head 10 and a pivotal center of the tape extracting arm 34 are the apices of the rhombus at the minor axis. Since these are disposed as described above, the trajectory of a free end of the tape in threading can be a circular arc, hence the tape can be quickly loaded, and the size of the apparatus can be made small.

The chassis 46 has an aperture 54 between the recording head 10 and the tape threading device 30. A flexible lead wire bundle 52 connected with the recording head 10 which records and/or reproduces signals, is drawn from the aperture 54 to a bottom side of the chassis 46, and is connected with a circuit board 80 provided beneath the chassis 46. Hence, the tape threading arm 34 is kept from interfering with the circuit board 80. A second circuit board 50 (shown in FIG. 1) is disposed along a longitudinal direction of a side of the chassis 46. This circuit board 50 mainly controls a tape transport system which is comprised of the first reel driver 68, second reel driver 70, and the tape threading device 30. The circuit board 50 may be provided at both longitudinal sides of the chassis 46.

Figure 9:
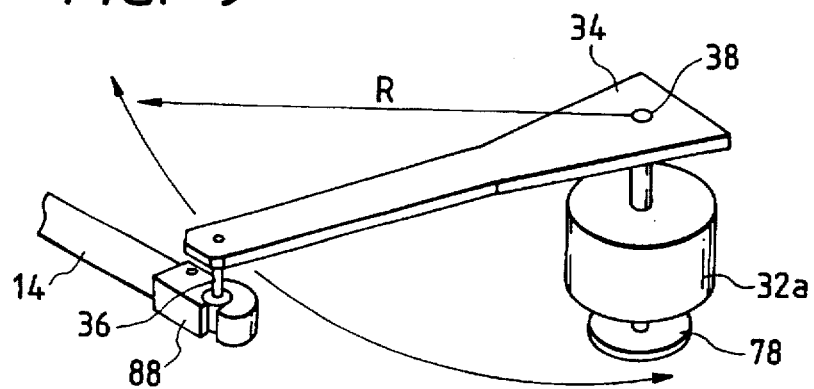
FIG. 9 is a perspective view of the tape threading device of the embodiment of FIGS. 1-8 and showing a coupled state of a tape extraction member and the tape.

The tape threading arm 34 is pivotable with certain clearance for preventing a contact with the recording head 10 and tape guides 22–28, and the arm 34 provides a threading pin 36 at a tip of the arm 34 (FIG. 9). The first reel driver 68 is comprised of a first reel motor 56 for driving the first reel 18, a hub 60 for coupling the first reel 18 with the first reel motor 56, and a speed sensor 64 held by the first reel motor 56. The second reel driver 70 is comprised of a second reel motor 58 for driving the second reel 40, a hub 62 for coupling the second reel driver 38 with the second reel motor 58, and a speed sensor 66 held by the second reel motor 58. A tension and a velocity of the tape 14 are calculated from detected values of these speed sensors 64, 66. A controller 76 which controls the tension and the velocity of the tape is connected with the first reel driver 68 and the second reel driver 70. In this embodiment, speed sensors 64, 66 are optical encoders, however they may be magnetic encoders or resolvers according to other contemplated embodiments of the invention.

FIG. 3 is a perspective view of the embodiment of the present invention showing an information recording and/or reproducing apparatus 82, according to FIGS. 1 and 2, shown in its housing 200. Housing 200 has an inserting opening 84 for inserting the tape cartridge 16 at a front end of the apparatus 82, and the second reel driver 70 holding the second reel 40 is disposed at a rear end of the apparatus 82. A width (w) and a height (H) of this apparatus 82 are consistent with those of so-called "8 inch Form Factor Size" conventionally used in the casings for Personal Computers and Work Stations (W=8.5 inches, H=5 inches). Therefore, it can conveniently use a standardized cartridge. Since there are small needs to adopt an 8 inch Form Factor Size (D=15 inches) about a depth (D) of this apparatus 82, a size of D of chassis 46 is 430 mm (approximately 16.93 inches) for stabilizing the tape transferring with the requested transferring path. This dimension D=430 mm is little longer than that of 8 inch Form Factor Size. Since the information recording and/or reproducing apparatus is set in a standard rack, there is room in the rack in depth direction. Therefore, the depth of 430 mm is satisfactory.

A width of the 8 inch Form Factor Size is about 216 mm (8.5039 inches), which is twice a width of the cartridge. Then a width of the chassis 46 must be about 180 mm keeping a space for a circuit board. On the other hand, since a width of the tape cartridge is 108 mm and a length(depth) of the tape cartridge is 124 mm, the width of the chassis is 1.7 times of the width of the tape cartridge. In addition, in this embodiment a length of chassis 46 is 430 mm, it is convenient to select a ratio between the width of the chassis 46 and the width of the tape cartridge 16 at about 1.7, and a ratio of a width and a depth in chassis 13 at about 2.5.

Furthermore, referring to FIG. 1, since a width (B) is 180 mm, a distance (A) (i.e. an offset) between the rotational center of the first reel 18 and the rotational center of the second reel 40 with regard to a longitudinal direction of the apparatus 82 must be beyond ½ of the width of the tape cartridge 16. Main elements of the information recording and/or reproducing apparatus 82 shown in FIGS. 1, 2 are arranged with above-described geometry. A distance $R_L$ between the rotational center of the first reel 18 and the rotational center of the second reel 40 is about 2.5 times the length of the tape cartridge 16 (FIG. 1). Since a distance between the tape cartridge and a first tape guide 24, and a distance between tape guides 22–28 themselves are very short, a ratio of the distance $R_L$ between the two rotational centers of the first and second reels 18, 40 and a length $L_T$ of the tape cartridge 16 is reduced to about 2. In this situation, the apparatus 82 is further miniaturized, and a ratio between a width and a depth in chassis 46 can be reduced to about 2.

Figure 4:
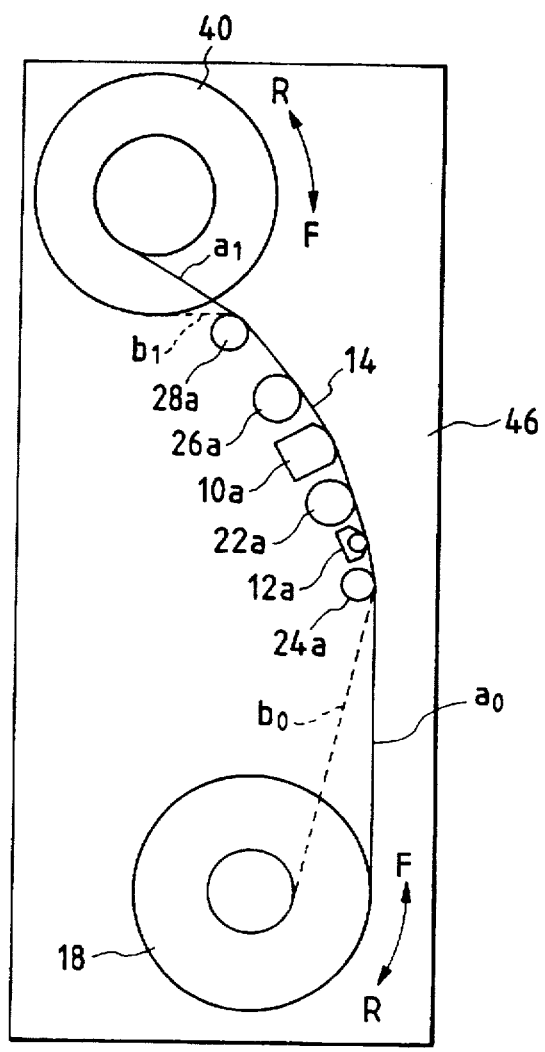
FIG. 4 is a schematic plan view of the embodiment of FIGS. 1-3, showing a tape path.

A method of a tape transferring is explained referring to FIG. 4. The tape 14 is wound onto the first reel 18 and onto the second reel 40 in the directions shown by arrows F and R. In FIG. 4, when the tape is wound wholly onto the first reel 18, the tape 14 positions are shown in solid line and denoted by symbols $a_0$ and $a_1$. On the other hand, when the tape 14 is wound wholly onto the second reel 40, the tape 14 positions are shown in broken line denoted by symbols $b_0$ and $b_1$. A rotational direction of the reels is depicted by arrows F if the tape 14 is being wound onto the second reel 40, and the rotational direction of the reels is depicted by arrows R if the tape 14 is being wound onto the first reel 18.

In addition, as shown in FIGS. 1 and 4, the pivotal axis 30 of the tape threading arm 34 and the recording head 10 are disposed at opposite sides respectively with regard to a line joining an axis of the first reel 18 and an axis of the second reel 40. This particular arrangement has an advantage of optimum use of the space available, i.e., the apparatus does not need to have a complicated tape threading mechanism as in conventional machine. Hence, the apparatus can be made simple and the width and the height of the apparatus can be shortened to avoid an interference of the tape threading arm 34 and the recording head 10 during the tape threading.

Further, a head 10a, a cleaning device 12a and the tape guides 22a–28a are arranged with respect to the second reel 40 such that a length $L_G$ between the rotational center of the first reel 18 and the tape guide 24a is about the same as the length $L_T$ of the tape cartridge 16. Hence, a deviation of the tape to the tape width direction is minimized.

To transfer the tape stably, a tension of the tape 14 must be controlled to the desired tension as well as a tape speed must be controlled to the desired speed. FIG. 2 shows a controller 76 for this purpose. Signals from speed sensor encoders 64, 66 are input to the controller 76. The controller 76 is comprised of a velocity controller 72 and a tension controller 74. The velocity controller 72 compares the signals from the encoders 64, 66 with pre-determined target speeds. The tension controller 74 calculates a difference of rotational speeds of the first reel 18 and the second reel 40 using the signals from the encoders 64, 66, then calculates the tension of the tape based on the difference of the velocities of these two reels. The tension controller 74 also outputs signals to the first and the second reel motor 56, 58, so that the speed and the tension of the tape coincide with pre-determined values. In this embodiment, the tension of the tape is calculated from the rotational speeds. The apparatus may also provide a tension detector according to other comtemplated embodiments.

Tape guides 22–28 are disposed on both sides of the head 10a, and the tape guides 22, 24 are arranged at one side, i.e., the first reel side, and the tape guides 26, 28 are arranged at the other side, i.e., the second reel side. Tape guide 22, 26 are guides for maintaining high accuracy of tape positioning toward the head 10 with respect to a tape width direction. Tape guides 24, 28 are disposed at opposite sides of the tape guides 22, 26 with respect to the head 10a, so as to provide wrapping angles at the tape guides 22, 26 which are not influenced by amounts of the tape wound onto the first and the second tape reels 18, 40. The tape guides 24, 28 also control a deviation of the tape 14 in a tape width direction.

Figure 5:
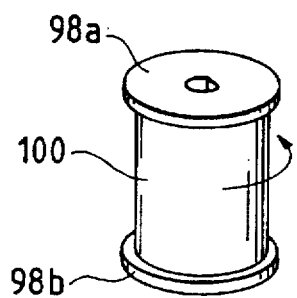
FIG. 5 is a perspective view of a first embodiment of a tape guide for use with the present invention.

Although wrapping angles at the tape guides 24, 28 vary with amounts of the tape wound onto reels 18, 40a, the tape guides can easily be adjusted to the such change. Namely, as shown in FIG. 5, tape guides 24, 28 are comprised of a rolling free roller 100 having two flanges 98a, 98b at respective opposite ends. The flanges 98a, 98b restrict the deviation of the tape in the tape width direction. Using these rolling free rollers, even if the amount of the tape wound onto the reels is varied, the tape can be transferred smoothly from the first reel 18 to the second reel 70a, and vice versa.

Figure 6:
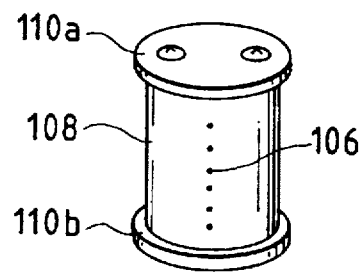
FIG. 6 is a perspective view of a second embodiment of a tape guide for use with the present invention.

If the apparatus 82 has an air supply, the tape guides may be guides 108 having blow holes 106 as shown in FIG. 6. In this situation, because the wrapping angle at the tape guide is small, a pressure of the tape to the tape guide is also small. Then, an amount of an air flow through blow holes can be little and the air supply can also be small.

Figure 7:
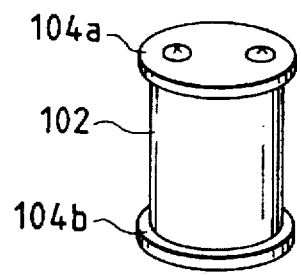
FIG. 7 is a perspective view of a third embodiment of a tape guide for use with the present invention.

The tape guides 22, 26 disposed at both sides of the recording head 10 are used to control a tape deviation at the head 10 as described above, so that the tape guides 22, 26 should be stationary guides which are not affected by the rotational fluctuation of the reels 18, 40. These stationary guides are comprised of flanges 104a, 104b and a stationary cylinder 102 as shown in FIG. 7. Even if the stationary guide is used, whenever the tape 14 is being transferred, an air film is formed between the tape 14 and the stationary cylinder 102. Therefore, a friction coefficient between the tape 14 and the stationary cylinder 102 is low, and a fluctuation of the tension may not be occurring during the tape transferring. However, because the air film is not formed at the start of the tape transferring, the friction coefficient between the tape 14 and the tape guide 102 becomes large. Hence, wrapping angles at the tape guides 22, 26 are set smaller than that of the tape guides 24, 28 which are disposed at the far side of the tape guides 22, 26 from the recording head 10. To avoid an increasing of a friction loss in the tape transferring, the tape guides 24, 28 are disposed adjustably on the head base member 48. The shape of the tape guides 22, 26 does not need to be a cylinder as shown in FIG. 7, as far as they can keep a wrapping angle within pre-determined values and they can control the tape deviation in the tape width direction.

In this embodiment shown in FIGS. 1–9, a target value of a tension fluctuation of the tape is set less than 10% of a tape tension. In general, a tension fluctuation (T) caused by friction is expressed as "T=exp($\mu\theta$)." Here, exp( ) is a base of Napierian logarithmic system, $\mu\theta$ is an exponent, $\mu$ is a friction coefficient, and $\theta$ is a wrapping angle. A friction coefficient between a tape and a tape guide is generally 0.3, therefore, if a tension fluctuation occurs at tape guides 22, 26 disposed at both sides of the head 10a, a tolerance of the tension fluctuation is less than 5% at one tape guide, and the corresponding wrapping angle $\theta$ is about 10 degrees.

As a result of the desired minimal tension fluctuation, it is desirable to set the wrapping angles at the tape guides 22, 26 less than 10 degrees. If an air supply is provided with the apparatus 82, the tape guides may be guides having blow holes. A rolling free roller shown in FIG. 5 may be used if the rotational speed is further accurate. In addition, it is preferred to dispose the tape guides 22, 26 symmetrically with respect to the recording head 10a, and/or to dispose the tape guides 24, 28 also symmetrically with respect to the recording head 10a, thereby effectively improving the accuracy of rotational speed, because the tape is wrapped onto the tape guides in the same manner in winding and in rewinding.

When the wrapping angles at the tape guides disposed at both sides of the recording head are substantially equal to each other, wrapping angle distribution is symmetrical with respect to the recording head 10. In this situation, the tape guides may be the same shape, and accuracy of manufacturing and assembling of the tape guides can be improved.

When the wrapping angle distribution at the tape guides is symmetrical with respect to the recording head 10a, and when the distance between two rotational centers of reels 18, 40 with respect to the longitudinal direction of the apparatus 82 is less than or equal to ½ times the width of the tape cartridge 16, a sum of the wrapping angles at tape guides 22–28 is about 90 degrees. The wrapping angles at the tape guides 22, 26 are about 35 degrees respectively, therefore, the tape guides 22, 26 next to the recording head in both sides can be arranged linear. Furthermore, since a trajectory of the tape 14 from the first reel 18 to the second reel 40 can be made substantially linear, the tape can be stably transferred, because the force normal to the tape transferring direction is very weak.

Figure 8:
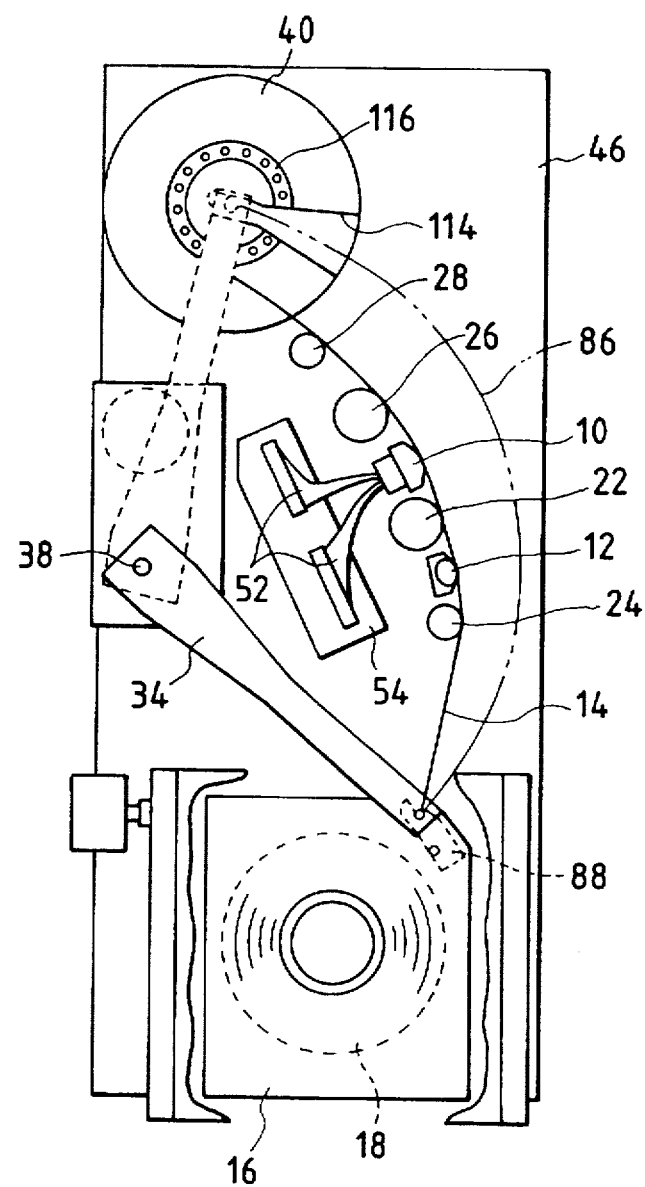
FIG. 8 is a schematic plan view of the embodiment of FIG. 1-3, showing a movement of a tape threading device.

Threading of the tape using the threading arm 34 is explained with reference to FIGS. 8, 9. When the tape cartridge 16 is inserted in the inserting opening 84, the tape cartridge 16 moves vertically as well as horizontally so as to engage a threading pin 36 disposed at an end portion of the threading arm 34 with a leader block 88 secured at free end of the tape 14 wound onto a first reel 18 contained in the tape cartridge 16. That is, the threading pin 36 is formed such that its diameter is bigger at the opposite end portion than at the engaging end portion with the threading arm 34. Therefore, the bigger diameter portion is coupled with a slot formed in the leader block 88. Since a width of the slot of the leader block 88 is less than the bigger diameter of the leader block 88, the leader block 88 accompanying the tape 14 must move with the threading pin 36. The threading arm 34 coupled with the leader block 88 pivots in the counterclockwise direction from bottom to top in FIG. 1. In that motion, the coupled members pass the outside of the recording head 10 mounted on the head base 48, then reach a periphery of the second reel 40. A radially extending slot 114 is formed in an upper side plate of the second reel 40. The coupled members reach an end of the slot 114, go along the slot 114 with a pivoting motion of the threading arm 34, then is disposed at a rotational center of the second reel 40 with a certain clearance. Thereafter, the tape is wound onto the second reel 40 by the rotating motion of the second reel 40 guided by an inner hub 116. Here, a trajectory of the leader block 88 is denoted by chained line 86 and a trajectory of the tape during winding and unwinding operations is denoted by solid line 14 in FIG. 8. To avoid interfering between a read/write circuit board 80 (shown in FIG. 2) of the recording head 10 and the threading arm 34, a flexible lead wire bundle 52 of the recording head 10 is drawn through an aperture 54 formed in the chassis 46 between the recording head 10 and the threading device 30a, and the lead wire bundle 52 is connected to a circuit provided at the bottom side of the chassis 46.

In rewinding the tape, the two reels 18, 40 work completely opposite as described above, namely, the reels rotate toward the opposite direction as described above. The tape wound onto second reel 40 is reduced gradually and when there is no tape on the hub 116 of the second reel 40a, the threading pin 36 being stationary until then, together with the leading block 88, moves along the slot 114 with the pivoting motion of the threading arm 34. They pass by the recording head 10 and reach the aperture of the tape cartridge 16.

When it is requested to remove the tape cartridge 16 from the apparatus 82, the tape cartridge 16 moves upward and horizontal. At that time, the leading block 88 also moves upward and it engages with the smaller diameter portion of the threading pin 36. The width of the slot formed in the leading block 88 is greater than the diameter of the smaller portion of the threading pin 36, therefore threading pin 36 easily separates from the leading block 88.

The tape threading arm 34 is pivotal at a shaft 38, and a trajectory of the threading pin 36 secured at an end portion of the tape threading arm 34 is a circular arc. The recording head 10 and the tape guides 22–28 are arranged within the circular trajectory 86. When the tape threading is finished and the tape 14 is wound onto the second reel 40a, the tape wrapping angles at the tape guides 22–28 and the recording head 10 are set to predetermined values.

A pivotal angle of the tape threading arm 34 from the aperture 118 of the tape cartridge 16 and to the rotational center of the second reel 40 is about 120 degrees. Since the pivotal center of the tape threading arm 34 is disposed at an end of the chassis 46 in a width direction and substantially in the center of chassis 46 in a longitudinal direction, the tape threading is completed by one pivotal motion of the arm 34 and the trajectory of the tape cannot be beyond the chassis 46. Furthermore, since the tape threading motion is one circular motion of the threading arm, the motion is simplified and a moving speed, i.e., the threading speed is expedited.

It is unnecessary to provide a complicated cam mechanism or a complicated arm for meeting a complicated tape threading trajectory used in a conventional apparatus, so that the number of the parts of the apparatus can be reduced, and reliability of the apparatus can be improved.

Figure 10:
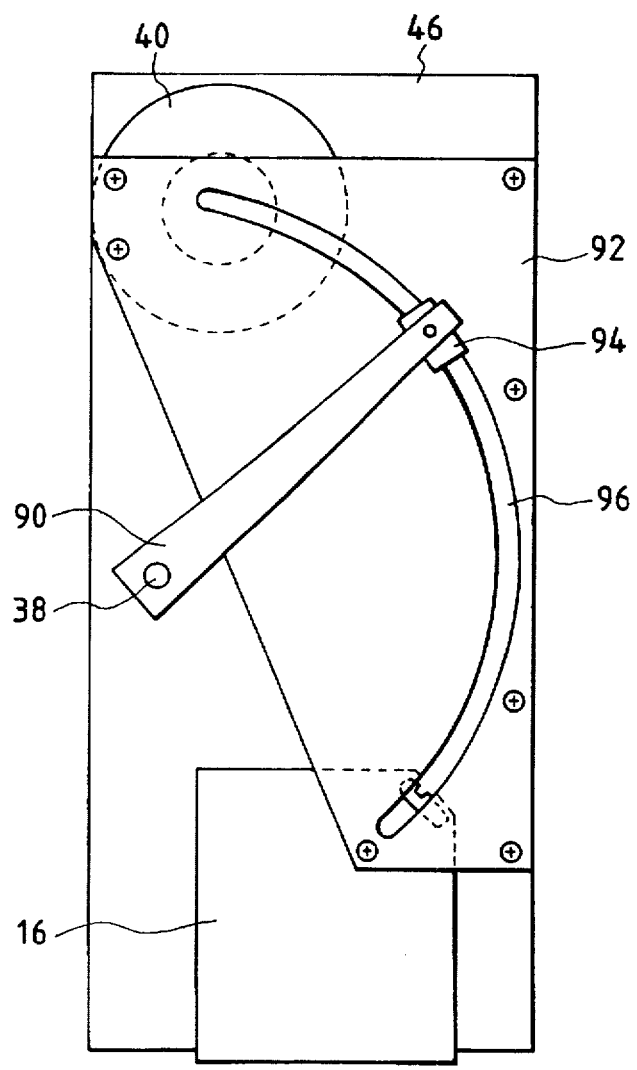
FIG. 10 is a schematic view of another embodiment of a tape threading device according to the present invention.
Figure 11:
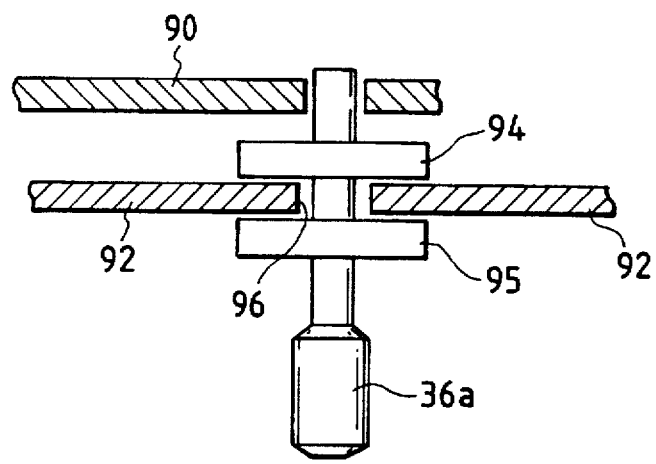
FIG. 11 is a cross-sectional view of an arm of the tape threading device shown in FIG. 10.

FIG. 10 shows a tape threading device constituted according to another preferred embodiment of the invention. In this FIG. 10 arrangement, a guide member 92 includes a guide groove 96 which is made of one circular arc, and a slider 94 which is provided at a tip of a slider driving arm 90 moves along this groove 96. Then, a trajectory of a leading block 36a provided below the sliders 94, 95 also follows a circular arc. The sliders 94, 95 hold the guide member 92 between them as shown in FIG. 11, so that this tape threading device moves stably.

The tape speed and the tension during the tape winding and rewinding are controlled to the pre-determined values using signals detected at the encoder 78 provided with a driving motor 32a and detected at the encoder 64 provided with the first reel motor 56.

Figure 12:
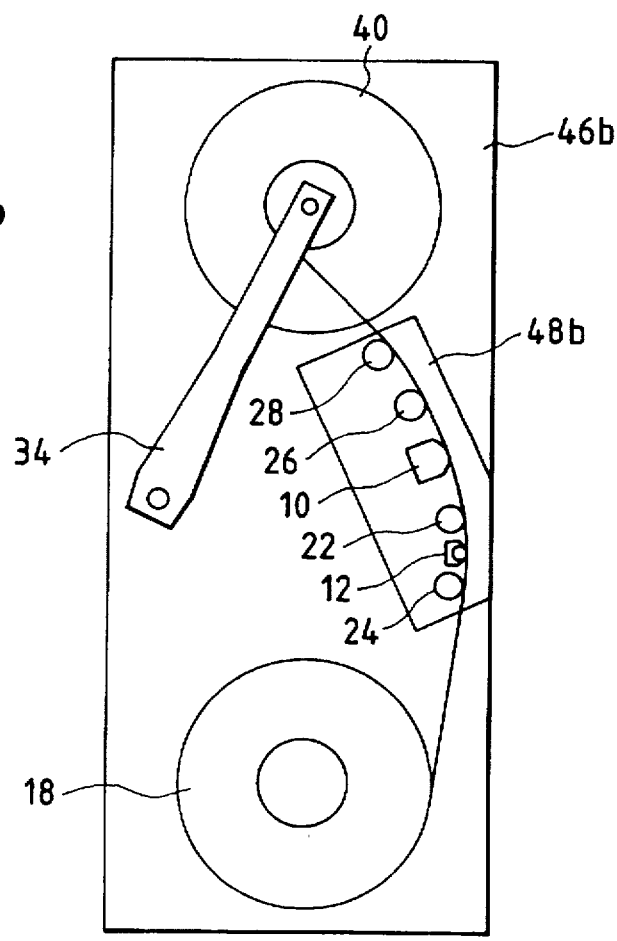
FIG. 12 is a schematic plan view of another embodiment of the present invention showing a tape path.

FIG. 12 shows another embodiment of this invention. In this drawing, similar reference numbers are used in FIG. 1 represent similar parts. This embodiment is different from the above embodiment only in that the first reel driver 68 and the second reel driver 70 are disposed parallel to an edge of the chassis 46b and near the center in a width direction of the chassis 46b, and the recording head 10 and the tape guides 22–28 mounted on head base member 48b are displaced toward the edge of the chassis 46b. Functions and relations between the recording head 10 and the tape guides 22–28 are similar to those described for the embodiment of FIGS. 1–9. In this embodiment, despite increasing a longitudinal length of the apparatus 82, it has an advantage that a width of the apparatus 82 becomes shorter.

FIG. 13 shows another embodiment of this invention. In this drawing, similar reference numbers are used in FIG. 1 represent similar parts. In this embodiment, the first and the second reel driver, the recording head, and the tape threading device are mounted in respective different ones of four equal quardrants of the chassis 46. Namely, the first reel axes 124 is in a quardrant I, the second reel axes 126 is in a quardrant III, the head 10 is in a quardrant II, and the pivotal axis 38 of the threading arm 34 is on a quardrant IV. This embodiment also has an advantage that a width of the apparatus becomes short and tape is threaded smoothly because of avoiding interference between tape threading arm 34 and the tape head 10 and tape guides 22–28.

An example of a layout of the circuit board used in the above embodiments is shown in FIG. 14. A circuit board 80 mainly controlling the read/write signals of the recording head 10 is provided beneath the chassis 46. The recording head 10 and the circuit board 80 are electrically connected using the flexible lead wire bundle 52 drawn from a rear side of the recording head 10. An aperture 54 is formed in the chassis 46 between the recording head 10 and the driving motor 32 of the tape threading device 30. The lead wire bundle 52 is drawn from a top surface to a bottom surface of the chassis 46 through this aperture 54.

A circuit board 50 for controlling the transfer of the tape 14 is provided beside a longitudinal edge of the chassis 46. The apparatus 82 may provide circuit boards 50 on both sides. Since there is no circuit board on or above the tape transport system, adjustment of the tape transport system can be done easily.

The present invention makes it possible to improve the performance of the tape transport system, namely, stabilizing the tape transferring and improving the reliability of the apparatus, because the apparatus has a substantially linear layout of the tape transport system. Furthermore, since the threading is made by one circular arc motion of the tape threading arm, the tape threading can be accomplished more quickly. It is possible to reduce a cost of the apparatus by reducing a size of the apparatus and simplifying the mechanism of the tape threading.

Although invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. An information recording and/or reproducing apparatus, comprising:
a first reel driver holding a first reel for winding an information recording tape onto the first reel around a first reel axis;

a second reel driver holding a second reel for transferring the tape from the first reel and winding the same onto the second reel around a second reel axis which is parallel to said first reel axis;

a recording head disposed between said first and said second reel drivers; and a tape threading device having a pivotal arm disposed between said first and second reel drivers for extracting the tape from the first reel and threading the tape onto the second reel outside of said recording head using said arm;

wherein a pivotal center of said pivotal arm and said recording head are disposed at opposite sides respectively with regard to a line joining the first reel axis and the second reel axis;

wherein at least two tape guides are provided on each side of said recording head respectively, said tape guides including first, second, third and fourth tape guides arranged sequentially along a travel path of tape from said first reel to said second reel with said first and second tape guides disposed at a first side of the recording head and said third and fourth tape guides disposed at a second side of the recording head; and wherein a sum of the tape wrapping angles at all tape guides is less than or equal to 90 degrees.

2. An information recording and/or reproducing apparatus according to claim 1, wherein a chassis is provided at least beneath the first and second reel for mounting said first and second reel drivers, said chassis having a top and a bottom at respective opposite axial sides of said reels.

3. An information recording and/or reproducing apparatus according to claim 2, wherein said chassis has a chassis area in a plane perpendicular to said reel axes, with a chassis length and a chassis width, said chassis length being between 2 and 2.5 times the chassis width.

4. An information recording and/or reproducing apparatus according to claim 2, wherein the first reel is disposed in a tape cartridge, said tape cartridge having a tape cartridge area in a plane perpendicular to said first reel axis, and wherein the ratio of the chassis length to the tape cartridge length is about 3.5, and the ratio of the chassis width and the tape cartridge width is about 1.7.

5. An information recording and/or reproducing apparatus according to claim 2, wherein the first reel is disposed in a tape cartridge, said tape cartridge having a predetermined length in an insertion direction of the tape cartridge, and wherein the distance between said first and second reel axes is between 2 and 2.5 times the length of the tape cartridge.

6. An information recording and/or reproducing apparatus according to claim 2, wherein said chassis has a wire guiding aperture between a pivotal center of said arm and said recording head for guiding wires connected to said recording head from the top to the bottom of the chassis.

7. An information recording and/or reproducing apparatus according to claim 2, wherein a first sensing means is provided at said first reel driver, a second sensing means is provided at said second reel driver, and wherein a controller for controlling at least one of speed and tension of the tape using outputs of said first sensing means and said second sensing means is connected to said first and second reel drivers.

8. An information recording and/or reproducing apparatus according to claim 7, wherein a third sensing means is provided on said tape threading device, and wherein said controller controls tape transferring speed during transfer of tape from the tape cartridge to said second reel.

9. An information recording and/or reproducing apparatus, according to claim 2, wherein a first distance from a tape extraction aperture of the tape cartridge to the pivotal center of said arm and a second distance from the tape extraction aperture to said recording head are substantially equal.

10. An information recording and/or reproducing apparatus, according to claim 9, wherein a third distance from the second reel axis to said recording head and a fourth distance from the second reel axis to the pivotal center of said arm are substantially equal.

11. An information recording and/or reproducing apparatus according to claim 1, wherein said tape guides are configured and disposed so that a wrapping angle of the tape at respective tape guides increases in accordance with a distance between said recording head and the respective tape guide.

12. An information recording and/or reproducing apparatus according to claim 1, wherein tape wrapping angles of said second and third tape guides are less than or equal to 10 degrees respectively.

13. An information recording and/or reproducing apparatus according to claim 1, wherein at least one of said tape guides is rotatably disposed.

14. An information recording and/or reproducing apparatus according to claim 13, wherein at least one of said tape guides has blow holes for blowing air to the tape.

15. An information recording and/or reproducing apparatus according to claim 1, wherein said second and third tape guides are stationary tape guides.

16. An information recording and/or reproducing apparatus, according to claim 1, wherein said tape guides are disposed symmetrically with respect to said recording head.

17. An information recording and/or reproducing apparatus, according to claim 1, wherein said first and fourth tape guides are freely rotatable cylindrical members, and wherein said second and third tape guides are fixed members.

* * * * *